April 11, 1967 M. E. EVANS ET AL 3,313,397
FEATHER TRANSFER AND STORAGE SYSTEM
Filed March 25, 1966 4 Sheets-Sheet 1

INVENTORS
Monroe E. Evans
Cyril D. Willin
BY
*B. B. Olive*
ATTORNEY

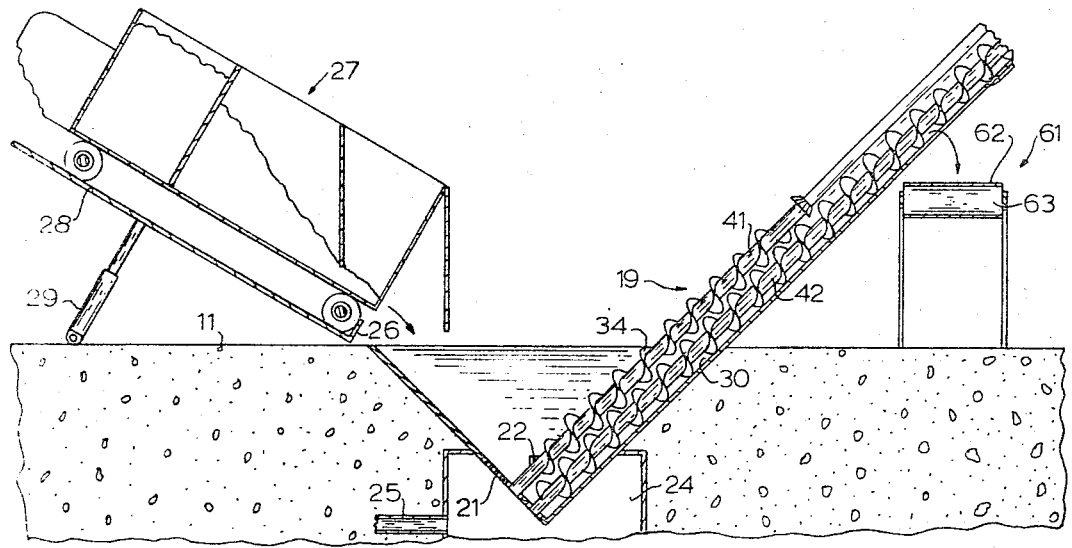
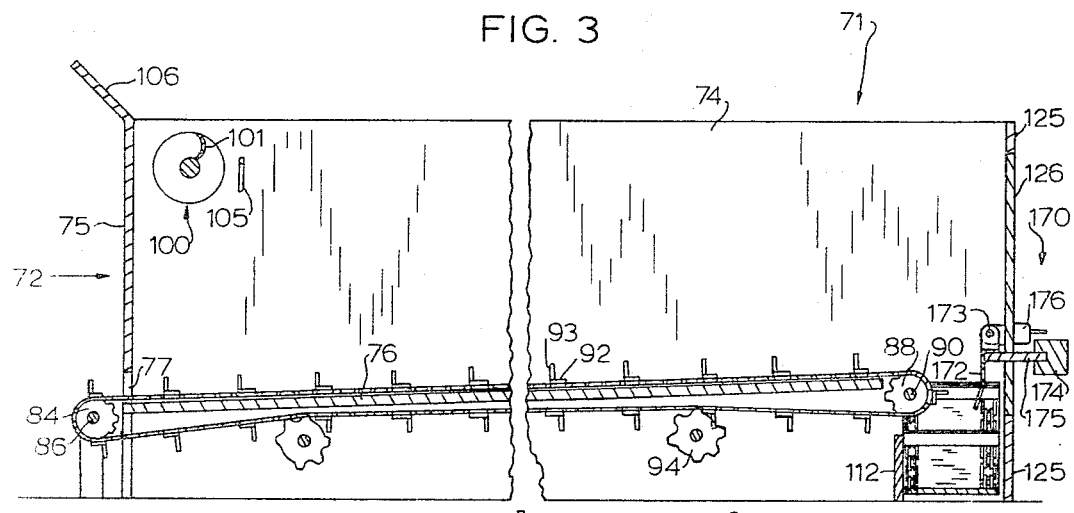
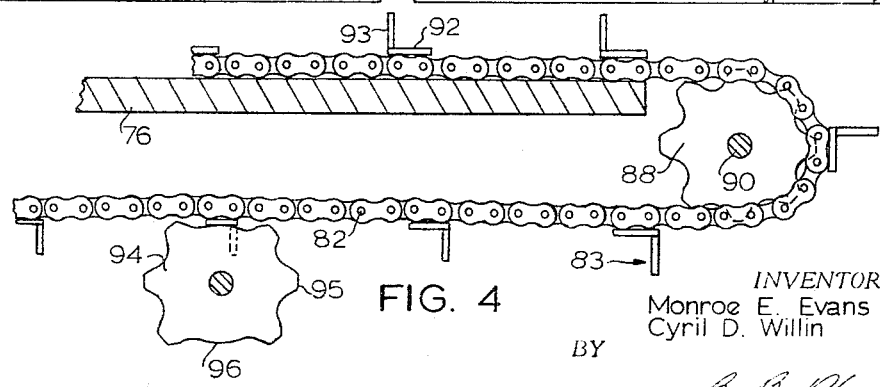

April 11, 1967   M. E. EVANS ET AL   3,313,397
FEATHER TRANSFER AND STORAGE SYSTEM
Filed March 25, 1966   4 Sheets-Sheet 3
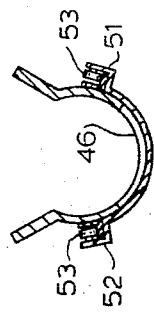
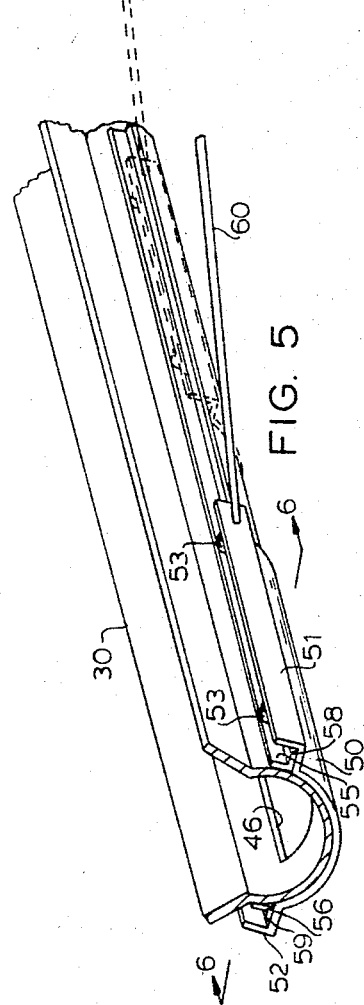
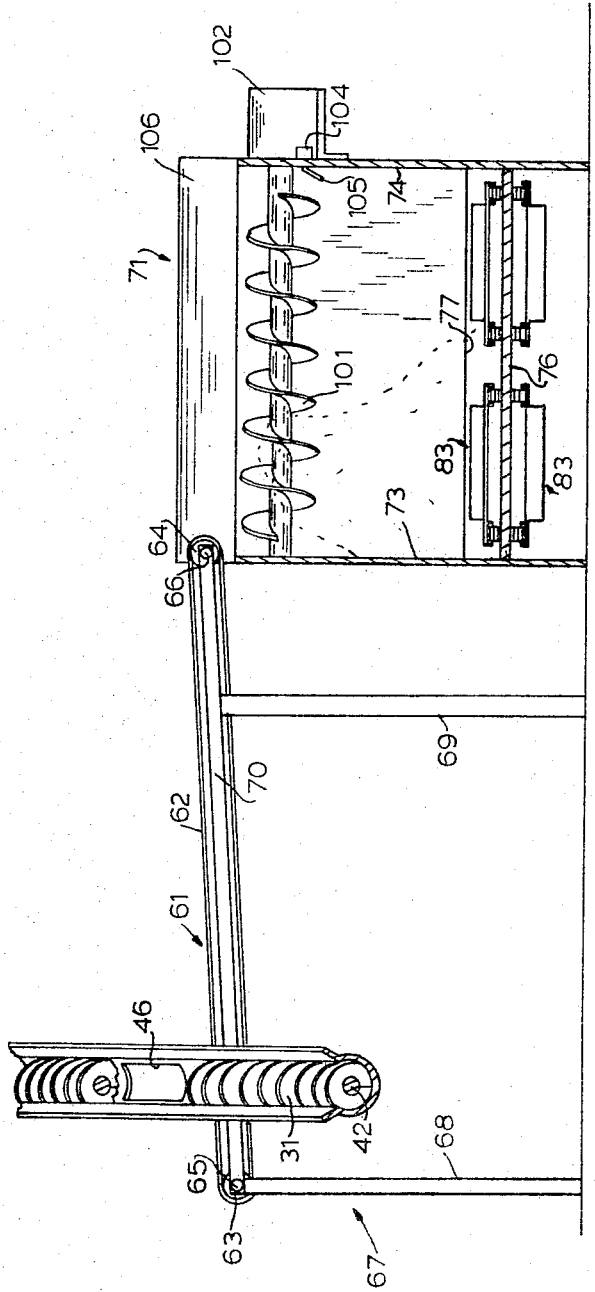
INVENTORS
Monroe E. Evans
Cyril D. Willin
BY
*B. B. Olin*
ATTORNEY INVENTORS
Monroe E. Evans
Cyril D. Willin

BY

ATTORNEY

United States Patent Office 3,313,397
Patented Apr. 11, 1967

3,313,397
FEATHER TRANSFER AND STORAGE SYSTEM
Monroe E. Evans and Cyril D. Willin, Fayetteville, N.C., assignors to Cape Fear Feed Products, Inc., Fayetteville, N.C., a corporation of North Carolina
Filed Mar. 25, 1966, Ser. No. 537,425
12 Claims. (Cl. 198—54)

ABSTRACT OF THE DISCLOSURE

A system for conveying and temporarily storing waste product feathers is constructed such that the system may receive and discharge moist feathers at varying flow rates while storing a mass of moist feathers and maintaining that mass in motion. A plurality of communicating conveyors transfer the moist feathers from a receiving hopper into one end of an elongated retention bin where the feathers accumulate into a mass which is moved to the other end by conveyor means located in the bin and are dumped onto a spreader conveyor which meters the feathers to the rendering cookers.

---

The waste products emanating from a poultry packing plant are categorically termed offal and feathers. Offal includes viscera, feet, heads and the like. These products are taken to a rendering plant and are converted into the high protein meal supplements for poultry and other animals. The feathers and offal are generally segregated prior to shipment to the rendering plant for it is necessary to process the offal without undue delay in order to reduce spoilage and the odor accompanying the same. The feathers may be stored for a period of time for the feathers do not generally decompose as readily as the offal. In the prior art, the feathers are dumped by means of a tractor trailer or the like onto a floor and at a later time, a front end loader material carrier transfers portions of the stacked feathers from the stack source to a conveyor which feeds the rendering cookers. The main difficulty in storing feathers in this manner is that the feathers harden into an impenetrable mass in a relatively short period of time. The front end loaders used in hauling the feathers are generally reinforced with steel; however, these vehicles only have a working life of a few months due to the tremendous strain under which they operate. To date, no feasible means has been devised whereby feathers may be stored for periods of time and be readily available for supplying the rendering cookers. Also, a considerable amount of floor space including a separate loading platform is required to accommodate the feathers, usually an appreciable percentage of the entire rendering plant. Even with careful planning, the labor and floor space which is set aside for the purpose of storing feathers is invariably idle for any given period of time. The storage of feathers in this manner also hinders the cleanup operations for the storage area is rarely entirely empty of feathers.

Therefore, an object of this invention is to provide a system for transporting feathers from a feather transport vehicle, storing the feathers for a given period of time and feeding the rendering cookers with feathers from the storage means at a predetermined rate.

Another object of this invention is to provide a feather storage and transfer system which is adapted to store quantities of feathers for a period of time while maintaining the same in motion.

A further object of this invention is to provide a feather storage and transfer system with a hopper system which is adapted to receive bulk feathers from a vehicle and to transfer the feathers onto a conveyor at a preselected rate.

Still another object of this invention is to provide a feather storage and transfer apparatus with an endless track system which is adapted to move quantities of feathers across and up a relatively flat surface.

Yet another object of this invention is to provide a feather storage and transfer apparatus with a plurality of conveyor track systems which are endlessly movable across a flat surface and which are associated with a means for distributing feathers in a transverse direction across the paths assumed by the plurality of parallel track systems.

Yet still another object of this invention is to provide a feather storage and transfer system which is adapted to move and store feathers in a cohesive mass and without the aid of water.

Other objects and advantages of this invention will become apparent when the following detailed description is read in conjunction with the appended drawings, specification and claims. A preferred embodiment of this invention will now be described with reference to the accompanying drawings, in which:

FIGURE 2 is a sectional view taken along lines 2—2 of FIGURE 1 and showing the feather hopper adapted to receive feathers from a moving vehicle and the tandem screw conveyor system which is adapted to remove the feathers from the hopper and selectively to place the same on a moving conveyor belt;

FIGURE 3 is a sectional view taken along lines 3—3 of FIGURE 1 and showing the elements which comprise the storage and transfer apparatus;

FIGURE 4 is a sectional fragmentary view of the chain and pull bar mechanism showing a chain support sprocket which is adapted to allow the pull bars to pass over the same;

FIGURE 5 is a fragmentary perspective view of the hopper discharge means showing a gate in a position of closure and in skeletons when it is in an open position;

FIGURE 6 is a sectional view taken along lines 6—6 of FIGURE 5 showing the apparatus for mounting the door closure;

FIGURE 7 is a sectional view taken along lines 7—7 of FIGURE 1 showing the dual track system, the intermediate conveyor and the screw conveyor which extends upwardly from the feather hopper;

Figure 1:
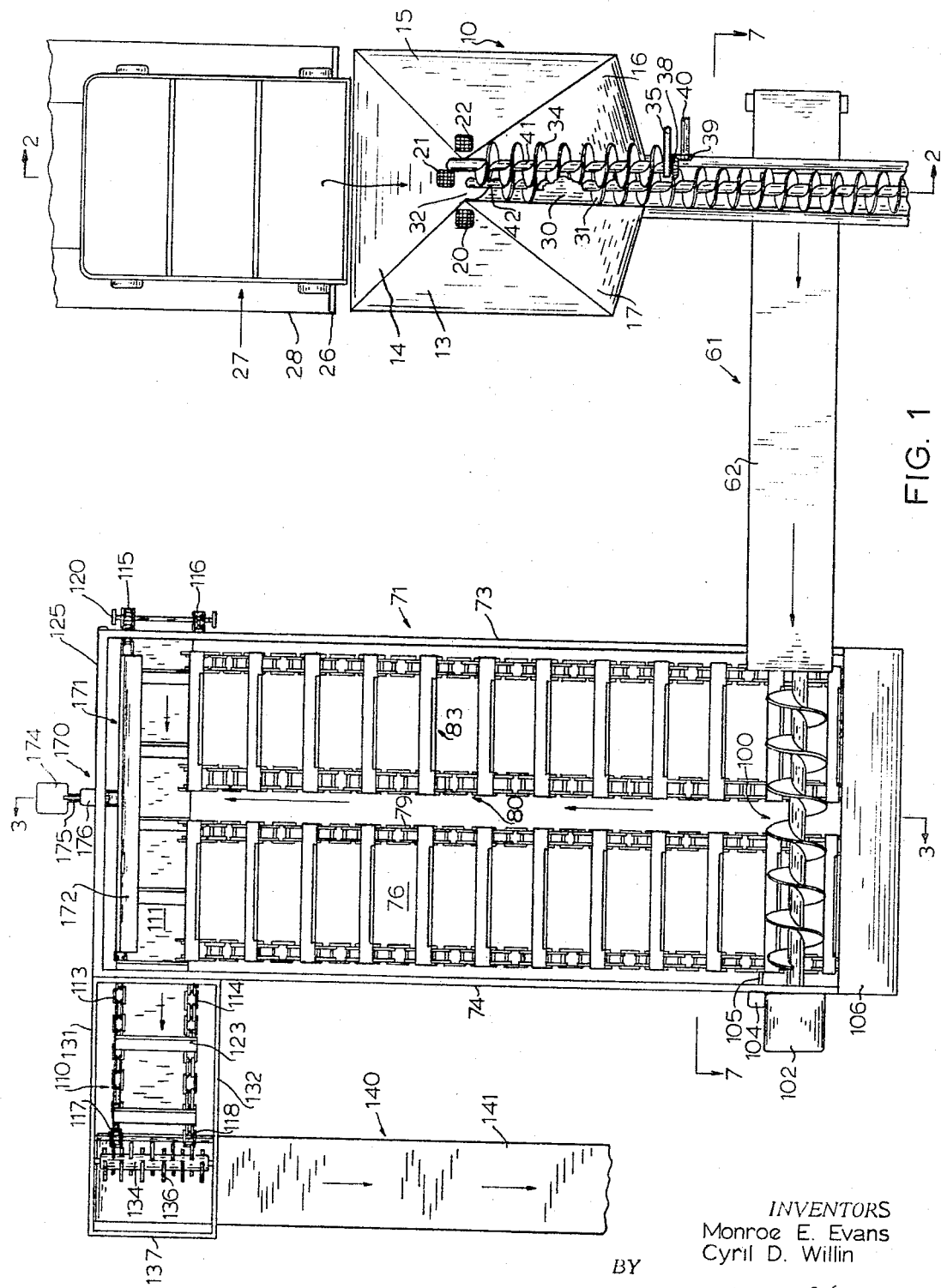
FIGURE 1 is a plan view showing the elements which comprise this invention and also showing the flow path assumed by the feathers in being transferred through this system.
Figure 8:
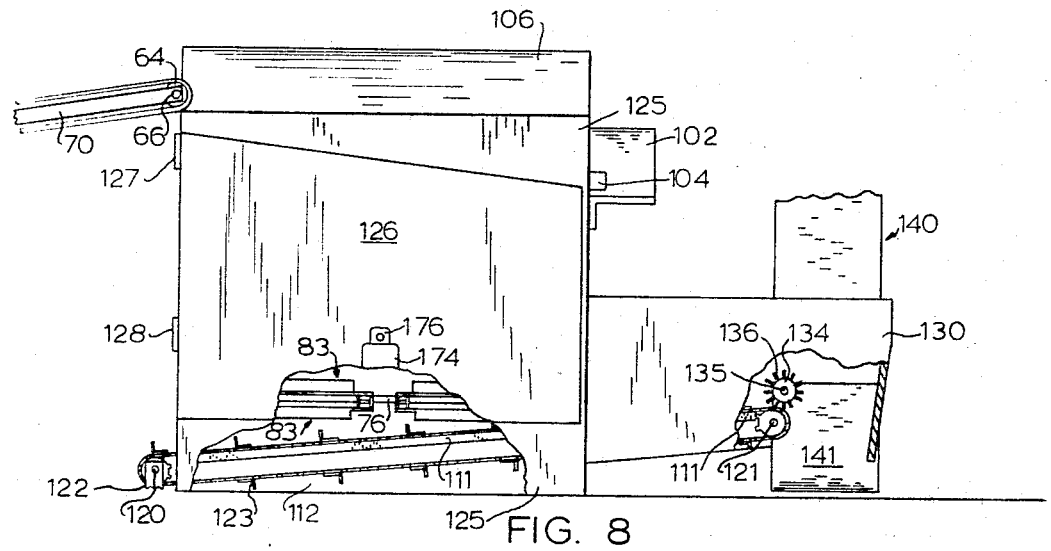
FIGURE 8 is a fragmentary elevation of the feather storage and transfer apparatus and of the spreader conveyor which directs the feathers to a feather spreader.
Figure 9:
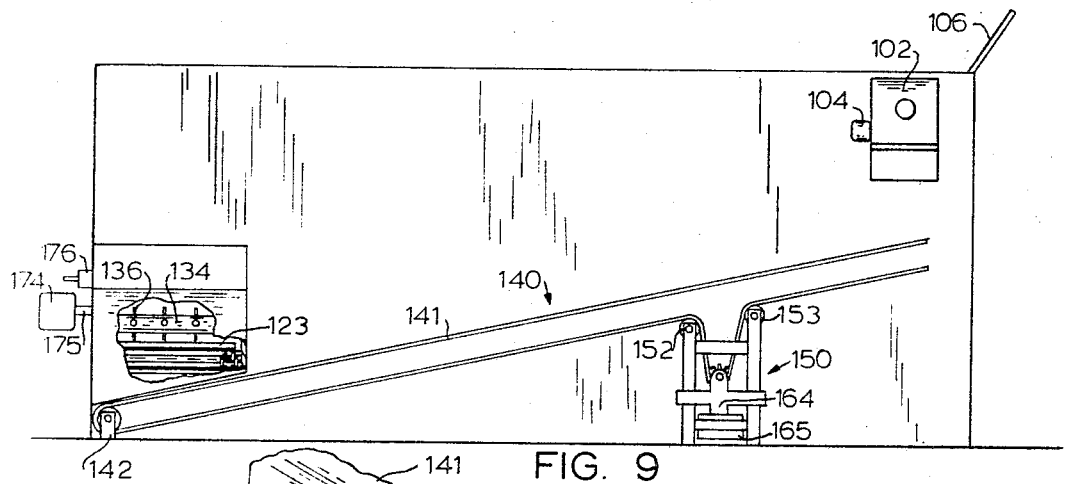
FIGURE 9 is an elevation view of the feather storage and transfer apparatus, the funnel for depositing the separated feathers onto the feeder conveyor which transfers the feathers to the rendering cookers and the belt tensioning device.
Figure 10:
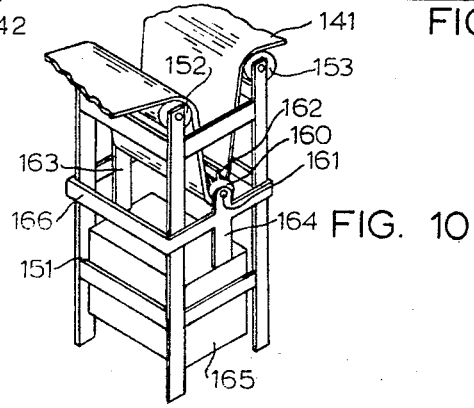
FIGURE 10 is a fragmentary perspective view of the belt tensioning device showing the elements which comprise the same.

The main embodiment of this invention provides a system for storing feathers whereby the feathers may be maintained in a state of motion. This system is comprised essentially of a hopper and screw conveyor mechanism, an intermediate conveyor in communication with the screw conveyor, a feather storage and transfer apparatus which receives feathers from the intermediate conveyor, a feather spreader conveyor which selectively receives feathers from the storage and transfer apparatus and a feeder conveyor which receives feathers from the feather spreader conveyor at a relatively constant rate and which transports the feathers to the rendering cookers.

The invention is illustrated in connection with the accompanying drawings in which the figures are illustrative of the preferred embodiment of the invention.

A receiving hopper 10 is recessed in floor surface 11 and is comprised of downwardly and inwardly sloping contiguous wall surfaces 13, 14, 15, 16 and 17. Each of these surfaces is triangular in shape and has a vertex touching an imaginary point which is common to all walls. Walls 13, 14 and 15 are respectively provided with grid drains 20, 21 and 22 which allow the excess wash water to flow into a sump 24. A drain line 25 which is connected to sump 24 is adapted to direct the excess wash water into a sewage or waste disposal system (not shown). Hopper 10 is supplied with feathers by means of a vehicle carrier 27 which as shown has been backed onto a tiltable platform 28, against a stop 26 and is raised to an angular position with respect to surface 11 by hydraulic cylinder means 29 pushing upwardly against platform 28.

The feathers are removed from hopper 10 by a screw conveyor system 19. Screw conveyor system 19 is comprised of a U-shaped auger tube 30 which joins selected edges of sides 16 and 17 of hopper 10. Auger tube 30 extends linearly beyond hopper 10 and receives auger 31 in the vertex thereof. Auger 31 is journaled in an extension 32 of side 14 and is rotated and supported by any convenient means (not shown) at its other end. The screw conveyor system includes a second auger 34 which has one end mounted in side 14 and the other end journaled in arm 35 which is connected to any support (not shown). The end of auger 34 journaled in arm 35 is provided with a bevel gear 38 which is driven by and in meshing engagement with bevel gear 39 of drive shaft 40. Shaft 41 of auger 34 and shaft 42 of auger 30 are in parallel alignment with shaft 41 being positioned upwardly and to the side of shaft 42. Auger 34 is placed at an angle with respect to auger 31 so as to prevent the bridging of the feathers and offal in hopper 10. Bridging is no longer a problem once the feathers have been moved upwardly along auger tube 30 above the level of the feathers residing in hopper 10.

Auger tube 30 is provided with an opening 46 in the bottom thereof which is away from and out of communication with hopper 10. Opening 46 serves as a gravity discharge means whereby feathers which are moved upwardly by auger 31 in auger tube 30 are allowed to drop through opening 46 and onto a conveyor, in a storage bin or some other like receiving means. Since hopper 10 and screw conveyor system 19 are adapted to handle both offal and feathers, opening 46 provides a means for directing the feathers along a separate route to the rendering cookers (not shown) for the offal generally is directed directly to other hoppers while the feathers are sometimes stored for periods of time. Therefore, opening 46 is provided with a closure means which, in reference to FIGURES 5 and 6, includes a U-shaped door 50 having opposed angle shaped side surfaces 51 and 52 which are extensions of U-shaped door 50. Angle shaped sides 51 and 52 are each provided with a plurality of rollers 53 which face inwardly and adapt door 50 to roll on a track. Auger tube 30 is provided with parallel and opposed angle rails 55 and 56 which are mounted externally of and face outwardly from auger tube 30. Angle rails 55 and 56 include longitudinal and parallel surfaces 58 and 59, respectively, which are adapted to receive rollers 53 and provide a track for the same. Door 50 is moved along surfaces 58 and 59 by any convenient means such as a cable 60 which, as shown, is connected to door 50.

The feathers after dropping through opening 46 are received by a belt conveyor 61 which extends from beneath opening 46 into an area above a storage area. Conveyor 61 is comprised of an endless conveyor belt 62 which is supported by and rollable across rollers 63 and 64 which are mounted on shafts 65 and 66, respectively, and which in turn are supported by frame 67. Frame 67 is comprised of vertical leg members 68 and 69 and a horizontal connecting member 70, said horizontal connecting member 70 supporting shafts 65 and 66, either one of which may be driven.

A feather storage and discharge apparatus 71 is positioned beneath the feeding end of intermediate conveyor 61 so that the feathers received by intermediate conveyor 61 from screw conveyor 19 will fall therein. Feather storage and transfer apparatus 71 is partially comprised of an open top, open end bin 72 which receives the feathers through the open top and discharges the same through the open end. Bin 72 is defined by a pair of opposed and parallel vertical side walls 73 and 74 and an end wall 75 which integrally connects end walls 73 and 74 and which extends downwardly from the top portions of side walls 73 and 74 a given distance. Bin 72 is provided with a smooth bottom surface 76 which is inclined upwardly toward the open end of bin 72 and has its lower end spaced beneath the downwardly projecting edge of end wall 75 to provide an elongated opening 77 therebetween, thus allowing the remaining water to drain out the lower end.

Bin 72 is provided with track systems 79 and 80; however, it may have only one track system or as many in parallel as necessary to accommodate the incoming feathers. It is contemplated that track systems 79 and 80 are driven independently and separately to increase the versatility of bin 72. Track system 80 which is representative is adapted to pass through elongated opening 77, slide across the bottom surface 76 and continue retroflexingly backwards under surface 76 to the point of beginning or at elongated opening 77. Track system 80 includes a pair of endless, flexible link chains 81 and 82 which are arranged in parallel and a plurality of angle shaped pull bars 83 which perpendicularly extend between chains 81 and 82 and which have their ends respectively secured to flexible chains 81 and 82. Chains 81 and 82 are aligned and supported at one end of track system 80 by pinion sprockets 84 and 85 (pinion sprocket 85 not shown) which are mounted on shaft 86, shaft 86 being supported by any convenient means. Positively driven sprockets 88 and 89 (sprocket 89 not shown) are in meshing engagement with chains 82 and 81, respectively, and are mounted beneath and adjacent the open end of bin 72. Positively driven sprockets 88 and 89 are mounted on shaft 90 and are driven by any convenient means (not shown) connected to shaft 90 at a preselected speed. Pull bars 83 are comprised of a horizontal and vertical portion 92 and 93, respectively, with the horizontal portion 92 being connected to chains 81 and 82. Vertical portion 93 extends between chains 81 and 82 but not over the same so as to allow horizontal portion 92 to pass over support sprocket 94 without causing disengagement between the respective chain and sprocket 94. As shown in FIGURE 4, sprocket 94 is provided with teeth 95 for engaging chain 82 and cylindrically smooth spaces 96 selectively located between selected teeth for allowing the horizontal portion 92 of pull bars 83 to pass over sprockets 94.

Feather storage and transfer apparatus 71 is provided with an auger 100 which is adapted to distribute the incoming feathers or the feathers falling off of intermediate conveyor 61 in a transverse linear direction across the several conveyor track systems. Auger 100 is rotatably mounted in parallel sides 73 and 74 a given distance above bottom surface 76 so that one end is directly beneath intermediate conveyor 61 while the other end is adapted to be positively driven by motor 102 which is mounted externally of storage and transfer apparatus 71. As the feathers pile up on surface 76 as shown in FIGURE 7, auger blades 101 push the feathers away from side 73, across tracks 79 and 80 to side 74. Either track 80 or 79 may be energized at any time to advance the feathers upwardly along sloping surface 76; however, a limit switch 104 having a lever arm 105 which is mounted on the inwardly facing surface of side 74 is adapted to automatically advance either track 79 or 80 or both when the feathers push against lever arm 105. Limit switch 104 is adapted to be connected to the power source (not shown) which drives tracks 79 and 80 by any convenient means. Bin 72 is further provided with an outwardly sloping surface 106 which is integrally mounted on back side 75 and which prevents feathers which engage auger 100 from spilling over the rear portions of bin 72.

As the feathers are pulled across bottom surface 76 by pull bars 83, they fall onto a spreader conveyor 110 which is positioned beneath that open end and which is arranged perpendicularly with respect to bin 72. Conveyor spreader 110 includes an upwardly sloping plate 111 which perpendicularly extends from a vertical wall surface 112 of bin 72. Separator conveyor 110 further includes a track system having endless link chains 113 and 114 extending around pinion sprockets 115 and 116 and positively driven sprockets 117 and 118, respectively. Pinion sprockets 115 and 116 are mounted on shaft 120 which is in turn supported by vertical support surface 122. Positively driven sprockets 113 and 114 are mounted on shaft 121 which is supported by any convenient means and driven by a power means (not shown). Chains 113 and 114 support and pull a plurality of pull bars 123 which have their ends integrally connected to chains 113 and 114. Spreader conveyor 110 is partially enclosed by a housing which is an extension of bin 72 with sides 73 and 74 forming a portion of that closure. A front wall 125 connects side walls 73 and 74 and is provided with a door 126 which is supported by hinges 127 and 128 which in turn are mounted on side wall 73. Door 126 is adapted to open outwardly and allow the excess feathers which have been deposited on spreader conveyor 110 to spill onto the floor surface thus preventing a feather jam when bin 72 is overloaded. Also, door 126 is provided with a limit switch mechanism 170 which is adapted to deenergize either track system 79 or 80 when spreader conveyor 110 becomes full of feathers. Limit switch mechanism 170 includes an elongated pivot arm 171 which has a feather engaging surface 172 and which is mounted on pin 173. Pivot arm 171 is maintained in an outwardly extending position by counter weight 174 which is connected thereto by shaft 175 which extends through door 126. As the feathers which are being dumped onto spreader conveyor 110 push against feather engaging surface 172 thus forcing it inwardly and raising counter weight 174 upwardly, limit switch 176 electrically deenergizes track systems 79 and 80 thereby allowing spreader conveyor 110 to clear the congested area. A portion of spreader conveyor 110 extends into a funnel type enclosure 130 which is integrally mounted on side wall 74 and extends outwardly therefrom. Funnel enclosure 130 is provided with side walls 131 and 132 which may support shaft 121. A feather spreader 134 which is mounted on shaft 135 is transversely positioned above the dumping end of conveyor 110. Feather spreader 134 includes a plurality of radially extending fingers 136 which may be of various lengths and which are adapted to engage the feathers on conveyor 110 at a speed whereby the feathers are separated and driven outwardly from conveyor 110. The separated feathers are forced against wall surface 137 which joins side surfaces 131 and 132 of funnel closure 130 and are directed downwardly by wall 137 onto a feeder conveyor 140.

Feeder conveyor 140 is adapted to transport the feathers which have been deposited thereon to rendering cookers (not shown) at a relatively constant rate. Feeder conveyor 140 is comprised of a conveyor belt 141 which is supported at one end by a pinion roller and shaft arrangement 142 and at the other end by any convenient means (not shown) and driven by any suitable power source (not shown). Conveyor belt 141 is provided with a tensioning device 150. Tensioning device 150 is comprised of a stand 151 which is adapted to be mounted on a floor or the like and which supports a pair of parallel and spaced apart rollers 152 and 153 which are rotatably mounted therein. A portion of conveyor belt 141 is drawn downwardly between rollers 152 and 153 so as to provide a U-shaped path having a vertex. A feather beater 160 which includes a shaft 161 and a plurality of uniform, radially aligned and axially extending rectangular plates 162 is rollably positioned in the vertex. To maintain the proper tension on conveyor belt 141, the ends of shaft 161 are journaled in downwardly extending arms 163 and 164 which are integrally connected to a weight 165. A frame guide 166 may be connected to downwardly extending arms 163 and 164 for aligning weight 165 in a vertical relationship with rollers 152 and 153. It can be seen by increasing or decreasing weight 165 the proper tension can be maintained in conveyor belt 141. To remove the belt for cleaning, shaft 161 is disassociated from arms 163 and 164 thereby loosening belt 141 for cleaning or removal.

In operation, a motor vehicle 26 carrying poultry feathers or the like is received by a tiltable platform 28 and tilted into a dumping position by hydraulic means 29. The feathers are dumped into hopper 10 as a result of this tilting action and the water which may be associated therewith drains into sump 24 through drain grids 20, 21 and 22. The feathers are then moved in a conventional manner by auger 31 and auger tube 30. Auger 34 which is positioned upwardly at an angle and in communication with auger 31 is of the same hand and is rotated at the same speed as auger 31 and prevents the bridging of the feathers in hopper 10. Since hopper 10 is adapted to receive both feathers and offal, a gate means is provided for the removal of the feathers from screw conveyor system 19. The feathers are forced by gravity out of auger tube 30 through opening 46 when door 50 has been moved upwardly along angle rails 55 and 56. When offal has been deposited into hopper 10, door 50 is lowered into a position of closing opening 46 whereby the offal travels upwardly along auger tube 30, over opening 46 and eventually into rendering cookers (not shown). The feathers fall through opening 46 and onto intermediate conveyor 61 where they are taken by conveyor belt 62 and dumped into bin 72. The feathers tend to pile up on bottom surface 76 of bin 72 and eventually reach upwardly and engage auger 100 which when energized pushes the feathers across track 80 and onto track 79. The feathers may continue to pile up at that end of bin 72 until they engage lever arm 105 of limit switch 104 whereupon either or both of the tracks 79 and 80 are energized and move the feathers forwardly and upwardly along sloping bottom surface 76. Bottom surface 76 is sloped upwardly to reduce the rolling of feathers forwardly from the top of the feather pile; therefore, a more positive control may be maintained over the feathers. Alternatively, as the feathers fall from conveyor belt 62 and onto track 80, track 80 may be energized whereby the feathers are pulled along the smooth bottom surface 76 by pull bars 83 and are dumped onto conveyor 110; also, the feathers may be moved so as to be stored for a period of time in bin 72 by advancing tracks 79 and 80 at a given slow rate of speed. The feathers are carried by spreader conveyor 110 to feather spreader 134 where they are separated by the fast rotating action of feather spreader 134 and are forced outwardly against end wall 137 of funnel housing 130. Where there is a tremendous overflow of feathers, door 126 may be opened thus allowing the feathers to spill over spreader conveyor 110 and onto the ground or floor surface. Occasionally, feathers are dumped onto spreader conveyor 110 faster than it is capable of transporting them to feather spreader 134; therefore, a limit switch 170 is mounted on door 126 and upon the feathers swinging pivoted arm 171 inwardly, conveyor tracks 79 and 80 are stopped thus allowing the congestion to be relieved by spreader conveyor 110. The feather spreader 134 is adapted to separate the feathers and in conjunction with end wall 137 deposits a relatively even layer of feathers on upwardly sloping feeder conveyor 140 which in turn transports the feathers to rendering cookers or to storage vats. The invention further includes a belt tensioning device 150 which is adapted to maintain the proper tension in conveyor belt 141 and also adapts the same to be easily removed for cleaning. The tensioning device includes a beater 160 which has a peripheral surface tracing a cylinder and which imparts vibrations to belt 141 thus shaking off any pendant feathers which remain thereon after the bulk of the feathers have been deposited into the rendering cookers.

Many different embodiments of this invention may be made without departing from the scope and spirit thereof. Therefore, it is to be understood that the invention is not to be limited to the specific embodiment shown and described herein, except as defined in the appended claims.

What is claimed is:

1. The combination of a feather storage and transfer system which receives feathers from a source and which selectively charges a rendering cooker with said feathers at a predetermined rate, said system comprising:
   (a) charging hopper means for receiving said feathers from said source, said hopper means having inwardly and downwardly sloping converging sides;
   (b) screw conveyor means extending into said hopper means and communicating with selected hopper sides for withdrawing said feathers from the same at a selected rate, said screw conveyor means including a gravity discharge means;
   (c) intermediate conveyor means having one end positioned beneath said gravity discharge means for receiving said feathers from said screw conveyor means, said intermediate conveyor means directing said feathers away from said screw conveyor means and discharging the same from the other end thereof;
   (d) storage bin means positioned under and adapted to receive said feathers from said other end of said intermediate conveyor means, said storage bin means including a flat bottom wall, upwardly extending side walls supporting said bottom wall, an end wall supported by said side walls above said bottom wall, an open end and at least one conveyor track means being operable to slide said feathers across said bottom surface and out said open end;
   (e) spreader conveyor means positioned adjacent said open end of said storage bin means and adapted to receive said feathers being ejected from said open end by said track means, said spreader conveyor means including an endless conveyor, a feather spreading means mounted above said endless conveyor and in communication with said feathers carried thereby for separating and forceably sweeping said feathers outwardly from said spreader conveyor means and a funnel means for defining a path of travel for said separated feathers; and
   (f) a feeder conveyor means mounted in said path for receiving said feathers from said spreader conveyor means, said feeder conveyor means adapted to transport said feathers to said rendering cooker.

2. The feather storage and transfer system of claim 1 wherein the portion of said hopper sides communicating with said screw conveyor means is U-shaped and recessed with respect to said sides and is extended out of said hopper means and is adapted to house said screw conveyor means.

3. The feather storage and transfer system of claim 2 wherein said screw conveyor means is comprised of an auger conveyor which is rotatably mounted in said U-shaped hopper portion and a breaking auger which is rotatably supported by means above and to one side of said conveyor auger, said breaking auger and said conveyor auger having the same hand and being adapted to turn in the same direction, said gravity discharge means being located in said U-shaped hopper portion whereby said feathers are drawn from said hopper and forced through said closeable opening by said auger conveyor and said breaking auger.

4. The feather storage and transfer system of claim 3 wherein said storage bin means includes a rectangular and inclined bottom wall, a pair of opposed and vertical side walls supporting said bottom wall and connected to said bottom wall along its longitudinally extending edges and a transverse, vertical end wall integrally connected to said opposed side walls and spaced a distance above said bottom wall to provide an elongated opening, said transverse end wall being positioned substantially adjacent and parallel to the lateral and lower edge of said inclined bottom wall whereby said track means is operable to slide said mass of moist feathers across said bottom wall and out said open end.

5. The feather storage and transfer system of claim 4 wherein said conveyor track means includes a pair of endless, flexible link chains, a plurality of angle shaped pull bars extending between and having their ends integrally connected to said chains, said angle shaped bars adapted to penetrate said feathers in said storage bin, pinion sprockets rotatably mounted below and adjacent said elongated opening and meshingly engaging respective link chains, positively driven sprockets mounted beneath said bottom surface and adjacent said open end of said bin and meshingly engaging respective link chains and power means connected to said positively driven sprockets, said power means adapted to rotate said positively driven sprockets in a direction whereby said pairs of endless chains and pull bars are pulled through said elongated opening to engage said deposited feathers and to move said feathers upwardly along said bottom surface and outwardly from said bin.

6. The feather storage and transfer system of claim 5 wherein said storage bin is provided with an auger in communication with said feathers being dumped into said bin by said intermediate conveyor and positioned perpendicular to and having its opposed ends rotatably mounted in said parallel sides a distance above said bottom surface, said auger adapted to distribute said incoming feathers in a transverse linear direction across said conveyor track means.

7. The feather storage and transfer apparatus of claim 6 wherein an electrically operated limit switch is mounted on a selected side wall in said bin adjacent an end of said auger opposite said feather source at a given distance from said bottom surface, said limit switch being operable to energize said power means when in contact with said feathers residing in said bin whereby said mass of moist feathers are moved across said bottom wall.

8. The feather storage and transfer apparatus of claim 7 wherein at least one support sprocket is provided for each of said link chains and is mounted under said bottom surface of said bin, said support sprocket having teeth for engaging the links of said chain and blank spaces located between selected teeth for allowing said pull bars to move over said sprocket.

9. The feather storage and transfer system of claim 8 wherein an electrically operated limit switch is mounted adjacent said spreader conveyor means at a given distance upwardly from the plane of said spreader conveyor, said limit switch being operable to deenergize said power means when in contact with said feathers residing on said spreader conveyor means.

10. The feather storage and transfer system of claim 1 wherein said feather spreading means includes a shaft rotatably and transversely mounted above said spreader conveyor means at its dumping end and a plurality of fingers of various lengths integrally connected to said shaft and perpendicularly arranged with respect to its axis, said shaft being adapted to be rotated at a predetermined rate of speed whereby said fingers engage and drive said feathers into said funnel means.

11. The feather storage and transfer system of claim 1 wherein said feeder conveyor means is provided with an endless conveyor belt and a belt tensioning device, said belt tensioning device comprising a frame, a pair of parallel and spaced apart rollers mounted on said frame beneath the feather carrying surface of said feeder conveyor means and having a portion of said endless belt drawn downwardly between said rollers, said downwardly extending belt portion tracing a U-shaped path having a vertex, an elongated beater rollably mounted in said vertex and having ends protruding outwardly from said belt path, a pair of arms respectively journaled on said beater ends and extending downwardly beneath said vertex and a preselected weight connecting the lower ends of said downwardly extending arms for inducing tension in said endless belt.

12. The feather storage and transfer system of claim 11 wherein said beater is comprised of a shaft and a plurality of uniform, radially aligned and axially extending rectangular plates, the outer longitudinal edges of said plates tracing the circumference of a cylinder.

References Cited by the Examiner
UNITED STATES PATENTS

| | | | |
|---|---|---|---|
| 2,406,886 | 9/1946 | McBean | 214—17 |
| 2,920,355 | 12/1960 | Clark | 198—57 |

EVON C. BLUNK, *Primary Examiner.*

RICHARD E. AEGERTER, *Examiner.*